US010220595B2

(12) United States Patent
Kobune et al.

(10) Patent No.: US 10,220,595 B2
(45) Date of Patent: Mar. 5, 2019

(54) PLATE WITH PRINTING LAYER AND DISPLAY DEVICE USING THE SAME

(71) Applicant: AGC Inc., Chiyoda-ku (JP)

(72) Inventors: Shinji Kobune, Tokyo (JP); Keiko Koyama, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 118 days.

(21) Appl. No.: 15/345,671

(22) Filed: Nov. 8, 2016

(65) Prior Publication Data

US 2017/0136734 A1 May 18, 2017

(30) Foreign Application Priority Data

Nov. 13, 2015 (JP) ................. 2015-222706

(51) Int. Cl.
B32B 7/02 (2006.01)
B32B 3/08 (2006.01)
(Continued)

(52) U.S. Cl.
CPC .................. B32B 7/02 (2013.01); B32B 3/08 (2013.01); B32B 7/12 (2013.01); B32B 17/00 (2013.01); B32B 17/06 (2013.01); B32B 27/08 (2013.01); B32B 2250/24 (2013.01); B32B 2255/10 (2013.01); B32B 2255/20 (2013.01); B32B 2255/26 (2013.01); B32B 2255/28 (2013.01); B32B 2307/4023 (2013.01);
(Continued)

(58) Field of Classification Search
CPC .. B32B 7/02; B32B 7/12; B32B 17/06; B32B 2457/202; B32B 3/08; B32B 27/08; B32B 17/00; B32B 2255/20; B32B 2307/4023; B32B 2255/28; B32B 2255/26; B32B 2457/20; B32B 2255/10; B32B 2250/24; B32B 2307/732; B32B 2307/538; B32B 2307/50; B32B 2307/418; B32B 2307/412; B32B 2307/75
See application file for complete search history.

(56) References Cited

U.S. PATENT DOCUMENTS

2014/0170387 A1* 6/2014 Kashima ................... B24B 9/00
428/157

FOREIGN PATENT DOCUMENTS

JP 2011-7830 1/2011
WO WO-2015146303 A1 * 10/2015 ......... B23K 26/0006

* cited by examiner

Primary Examiner — Nathan L Van Sell
(74) Attorney, Agent, or Firm — Oblon, McClelland, Maier & Neustadt, L.L.P.

(57) ABSTRACT

The present invention relates to a plate with a printing layer containing a plate having a first main surface, a second main surface and an edge face, and a printing layer provided on a periphery of the first main surface, in which the plate has an outer circumferential part corresponding to an outer circumferential part of the printing layer and an inner circumferential part corresponding to an inner circumferential part of the printing layer, in which the outer circumferential part of the plate has, in at least a part of the whole circumference, an outer circumferential region, and the inner circumferential part of the plate contains an inner circumferential region corresponding to the outer circumferential region, and in which the outer circumferential region has a surface roughness $R_2$ and the inner circumferential region has a surface roughness $R_1$, and $R_2 > R_1$ is satisfied.

14 Claims, 6 Drawing Sheets

(51) Int. Cl.
  B32B 17/00   (2006.01)
  B32B 7/12    (2006.01)
  B32B 17/06   (2006.01)
  B32B 27/08   (2006.01)
(52) U.S. Cl.
  CPC ... *B32B 2307/412* (2013.01); *B32B 2307/418* (2013.01); *B32B 2307/50* (2013.01); *B32B 2307/538* (2013.01); *B32B 2307/732* (2013.01); *B32B 2307/75* (2013.01); *B32B 2457/20* (2013.01); *B32B 2457/202* (2013.01)

PLATE WITH PRINTING LAYER AND DISPLAY DEVICE USING THE SAME

TECHNICAL FIELD

The present invention relates to a plate with a printing layer and a display device using the same.

BACKGROUND ART

A display device such as a liquid crystal display device is conventionally used in a personal digital assistance such as a mobile phone, and in a panel display. Those display devices are composed of a display panel such as a liquid crystal panel displaying an image, a backlight emitting illumination light to the display panel, and the like. In recent years, a protective member has been arranged on a front surface of these display panels in order to reduce external light reflection and to protect the display panel from external shock.

At first, illumination light from the backlight has leaked outside the display panel in some cases, and the illumination light leaked has leaked to a user side in some cases from a space between the display panel and a case housing the same. There has been a problem that the leaked illumination light makes it difficult to obtain a sufficient contrast of the display panel, and visibility is deteriorated. To remedy this problem, a printing layer has been provided in some cases on a surface at a display panel side of the protective member so as to surround a display region of the display panel. The printing layer is formed with repeatedly applying a paint to increase light-shielding property.

However, the conventional protective member shown in Patent Document 1 and the like had a problem that peeling and crack of the printing layer, particularly peeling and crack of the printing layer from an outer circumferential edge, occur in packing and transportation steps for shipment, or in an assembling step of the display device or the like, resulting in a defective product. To prevent occurrence of scratches, adhesion of dust, and the like in shipping a protective member to the destination, the protective layer may be shipped with a film being adhered to both surfaces of the protective member. In order to incorporate the protective member into a display device in the destination, the protective member is installed in the assembling step after the film is removed. However, peeling and crack may occur from an outer circumferential edge of the printing layer in removing the film, resulting in a defective product.

Patent Document 1: JP-A-2011-7830

SUMMARY OF THE INVENTION

The present invention has been made in view of the above problems, and its object is to provide a plate with a printing layer that is difficult to cause peeling and crack, and to provide a display device using the plate.

The plate with a printing layer of the present invention contains a plate having a first main surface, a second main surface and an edge face, and a printing layer provided on a periphery of the first main surface, in which the plate has an outer circumferential part that corresponds to an outer circumferential part of the printing layer and an inner circumferential part that corresponds to an inner circumferential part of the printing layer, in which the outer circumferential part of the plate has, in at least a part of the whole circumference, an outer circumferential region and the inner circumferential part of the plate contains an inner circumferential region that corresponds to the outer circumferential region, and in which the outer circumferential region has a surface roughness $R_2$ and the inner circumferential region has a surface roughness $R_1$, and the $R_2$ is larger than the $R_1$.

According to the present invention, a surface roughness of the outer circumferential region of the plate is larger than that of the inner circumferential region, and an ink used in the printing layer formed on the plate incorporates into a surface structure (unevenness) due to a surface roughness of the plate. As a result, the printing layer is difficult to peel, and a plate with a printing layer having less defects can be prepared.

In a preferred embodiment of the present invention, 100 nm≤$R_2$≤1000 nm is satisfied.

According to the preferred embodiment, by controlling the surface roughness $R_2$ to this range, peeling resistance of the printing layer can be improved, and at the same time, a plate with a printing layer having further excellent appearance can be prepared.

In a preferred embodiment of the present invention, the plate further contains a connection part between the first main surface and the edge face, and the connection part constitutes the outer circumferential region.

According to the preferred embodiment, the outer circumferential region having the surface roughness $R_2$ is formed on the connection part. Therefore, the plate with a printing layer having more excellent appearance can be prepared without deteriorating visibility when a user has visually recognized.

In a preferred embodiment of the present invention, the printing layer has an outer circumferential edge placed on the connection part.

According to the preferred embodiment, an outer circumferential edge of the printing layer is present on the connection part, and the printing layer on the outer circumferential region is strongly fixed. Therefore, peeling starting from the outer circumferential edge of the printing layer can be suppressed.

In a preferred embodiment of the present invention, the printing layer has an outer circumferential edge and the outer circumferential part of the printing layer is a region surrounded by the outer circumferential edge and a virtual line corresponding to more than 0 mm and 0.5 mm or less toward the inner circumferential side of the printing layer from the outer circumferential edge.

According to the preferred embodiment, the outer circumferential part of the printing layer is located on the vicinity of the outer circumferential edge of the printing layer, and thus is placed on the vicinity of the outer circumferential edge of the plate. Therefore, the outer circumferential region is also located on the vicinity of the outer circumferential edge of the plate. Therefore, a plate with a printing layer having excellent appearance can be obtained without deteriorating visibility when a user has visually recognized.

In a preferred embodiment of the present invention, the printing layer has an inner circumferential edge and the inner circumferential part of the printing layer is a region surrounded by the inner circumferential edge and a virtual line corresponding to more than 0 mm and 0.5 mm or less toward the outer circumferential side of the printing layer from the inner circumferential edge.

According to the preferred embodiment, the inner circumferential region is placed on the vicinity of the inner circumferential edge of the printing layer, which is a site that a user is most easy to visually recognize, and has a small surface roughness as compared with that of the outer circumferential region. Therefore, a plate with a printing layer having more excellent appearance can be obtained.

In a preferred embodiment of the present invention, the connection part is a curved surface having a center of curvature inside the plate and having a radius of curvature of 0.05 mm or more and 0.5 mm or less.

According to the preferred embodiment, even though the area in the planar view of the outer circumferential region is the same, the actual area of the outer circumferential region can be enlarged by forming the connection part having a curved surface. Therefore, a plate having a printing layer that is further difficult to peel can be obtained.

In a preferred embodiment of the present invention, the connection part forms a line segment that connects a side corresponding to the first main surface with a side corresponding to the edge face in a cross-sectional view in a thickness direction, and two angles at a plate side formed at intersections between the respective sides and the line segment become an obtuse angle.

According to the preferred embodiment, the connection part can be easily formed, and even though the area in a planar view of the outer circumferential region is the same, the actual area of the outer circumferential region can be enlarged. Therefore, a plate having a printing layer that is further difficult to peel can be obtained.

In the preferred embodiment of the present invention, the total of the two angles is 270°.

According to the preferred embodiment, each of angles at both edges of the line segment that forms the connection part becomes an obtuse angle, and this makes easy to handle.

In a preferred embodiment of the present invention, the width of the connection part is 0.05 mm or more and 0.5 mm or less from the edge face in a planar view of the plate.

According to the preferred embodiment, the connection part is located on the vicinity of the outer circumferential edge of the plate. Therefore, a plate with a printing layer having excellent appearance can be prepared without deteriorating visibility when a user has visually recognized.

In a preferred embodiment of the present invention, the plate is formed of a glass.

According to the preferred embodiment, glass has high strength and has good quality feeling of a material. Therefore, a plate with a printing layer having both high strength and good quality feeling can be obtained.

In a preferred embodiment of the present invention, the glass is a strengthened glass.

According to the preferred embodiment, the glass is glass having excellent strength and scratch resistance. Therefore, a plate with a printing layer having safety and durability can be obtained.

In a preferred embodiment of the present invention, the plate with a printing layer is used in a display device.

According to the preferred embodiment, when the plate with a printing layer of the present invention is used as a cover for a display device, the printing layer is difficult to peel and to be scratched in the handling when incorporated into the display device. Therefore, productivity of a product can be improved.

The display device of the present invention contains the above-described plate with a printing layer, a frame supporting the plate with a printing layer, a liquid crystal module, and an adhesive layer connecting the plate with a printing layer to the liquid crystal module.

According to the present invention, the printing layer is difficult to peel. Therefore, durability of a display device provided with the plate with a printing layer can be improved.

According to the present invention, a plate with a printing layer that is difficult to cause peeling and crack can be provided, and a display device having the same can also be provided.

MODE FOR CARRYING OUT THE INVENTION

The embodiments of the present invention are described in detail below by reference to the drawings. However, the present invention is not limited to the embodiments described below. Any modification and improvement in a range that the object of the present invention can be achieved are incorporated in the present invention.

(First Embodiment)
(Structure of Plate with Printing Layer)

Figure 1A:
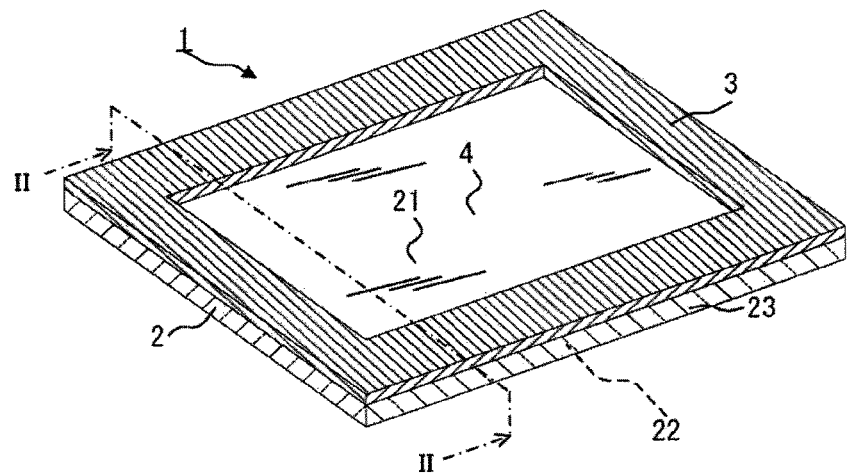
FIG. 1A is a perspective view illustrating the overall structure of a plate with a printing layer according to a first embodiment of the present invention.
Figure 1B:
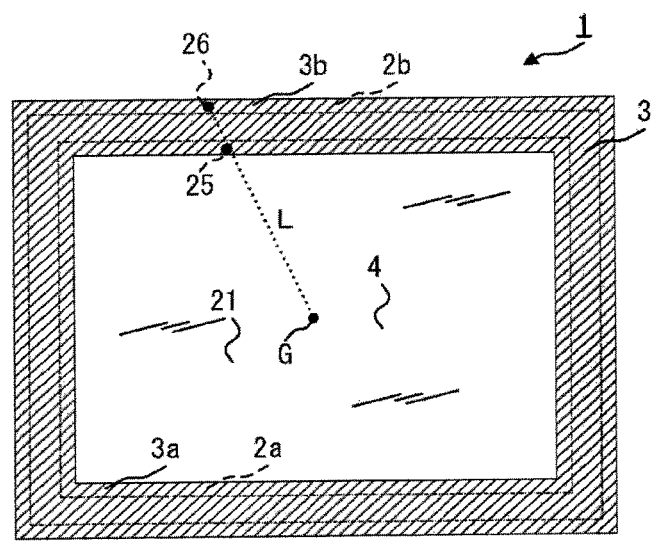
FIG. 1B is a plan view illustrating the overall structure of a plate with a printing layer according to a first embodiment of the present invention.
Figure 2:
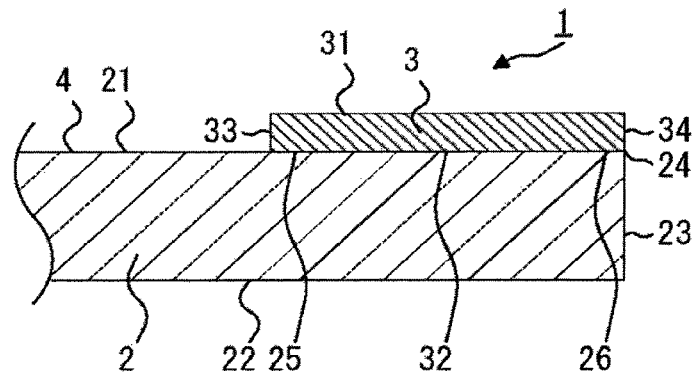
FIG. 2 is a cross-sectional view taken along II-II in FIG. 1A.

FIG. 1A and FIG. 1B are a perspective view and a plan view, respectively, which illustrate the whole structure of a plate with a printing layer according to a first embodiment of the present invention. FIG. 2 is a cross-sectional view taken along II-II in FIG. 1A. A plate 1 with a printing layer of the present embodiment contains a plate 2 and a printing layer 3.

The plate 2 has a first main surface 21, a second main surface 22 and an edge face 23.

The printing layer 3 is provided on a periphery of the first main surface 21 of the plate 2, and is formed by recoating to form plural layers such that a function such as a desired light-shielding property is achieved. A region other than the printing layer 3 on the plate 2 constitutes a display region 4. The printing layer 3 has a face 31 that does not come in contact with the plate 2, a face 32 that comes in contact with the plate 2, an inner circumferential edge 33 that is an edge face at a side of the display region 4 of the plate 2, and an outer circumferential edge 34 that is an edge face at a side of the edge face 23 of the plate 2.

In the plan view of the plate 1 with a printing layer as illustrated in FIG. 1B, an edge face side of the printing layer 3, which is located at a position farther from the center G of gravity of the plate 2, is defined as "outer circumference", and an edge face side of the printing layer 3, which is located at a position near the center G of gravity, is defined as "inner circumference".

On the plate 2 (on the display region 4) is arranged a display panel such as a liquid crystal panel when preparing a display device that is a final product. The display panel has wiring, circuit and the like for driving. If the wiring, circuit and the like can be visually recognized when the display panel has been visually recognized through the plate 2, this deteriorates beautiful appearance. The wiring, circuit and the like arranged in the vicinity of the outer circumference of the display panel can be shielded by providing the printing layer 3 on a periphery of the plate 2, thereby enhancing beautiful appearance.

The periphery means a belt-like region having a given width toward the central part of the plate 2 from the outer edge of the plate 2. The printing layer 3 may be provided on the entire circumference of the periphery of the first main surface 21 and may be provided on a part of the periphery. The width of the printing layer 3 may be the uniform and may be not uniform. Also the thickness of the printing layer 3 may be uniform and may be not uniform.

The plate 2 has an outer circumferential part 2b corresponding to an outer circumferential part 3b of the printing layer 3 and an inner circumferential part 2a corresponding to an inner circumferential part 3a of the printing layer 3. The outer circumferential part 2b has different surface roughness in at least a part of the entire circumference from that of the corresponding inner circumferential part 2a. When the region of the outer circumferential part 2b having different surface roughness in at least a part of the entire circumference is defined as an outer circumferential region 26, the region of the inner circumferential part 2a corresponding thereto is defined as an inner circumferential region 25, the surface roughness of the former is $R_2$, and the surface roughness of the latter is $R_1$, $R_2$ is larger than $R_1$. Accordingly, a part of an ink forming the printing layer 3 enters unevenness of the outer circumferential region 26 having a large surface roughness, and the printing layer 3 is strongly fixed to the plate 2. As a result, even when an impact is applied to the outer circumferential edge 34 of the printing layer, peeling and crack of the printing layer 3 are difficult to occur.

The description "the inner circumferential region 25 corresponds to the outer circumferential region 26" indicates the relationship that in a plan view of the plate 1 with a printing layer illustrated in FIG. 1B, when a line segment L connecting the center G of gravity of the plate 2 with an optional point in the outer circumferential region 26 is drawn, a site at which the line segment L crosses with the inner circumferential part 2a is in the inner circumferential region 25.

The surface roughness is an arithmetic average roughness Ra (hereinafter referred to as "surface roughness"), and can be measured according to the method defined in JIS B 0601: (2001) (ISO 4287: 1997). As the measurement method of surface roughness, specifically, a sample was measured by a surface texture and contour measuring instrument (trade name: SURFCOM 1400D-LCD, manufactured by Tokyo Seimitsu Co., Ltd.).

The surface roughness $R_2$ of the outer circumferential region 26 is preferably 100 nm or more, more preferably 300 nm or more, and still more preferably 450 nm or more. In the case where the surface roughness $R_2$ is within this range, a part of an ink of the printing layer 3 can enter unevenness and peeling resistance and crack resistance of the printing layer 3 can be obtained. The surface roughness $R_2$ of the outer circumferential region 26 is preferably 1000 nm or less, more preferably 900 nm or less, and still more preferably 800 nm or less. In the case where the surface roughness $R_2$ is within this range, the plate 2 has good transparency, resulting in beautiful appearance.

It is preferred that the outer circumferential part 3b of the printing layer is a region surrounded by the outer circumferential edge 34 of the printing layer 3 and a virtual line corresponding to more than 0 mm and 0.5 mm or less toward an inner circumferential side from the outer circumferential edge 34. Accordingly, good visibility can be secured when the plate 1 with a printing layer of the present invention is used in a display device. Furthermore, there is another effect that even when an impact is applied to the outer circumferential edge 34 of the printing layer 3, peeling and crack of the printing layer 3 can be suppressed. The outer circumferential part 3b of the printing layer 3 is more preferably a region surrounded by the outer circumferential edge 34 of the printing layer 3 and a virtual line corresponding to more than 0 mm and 0.4 mm or less toward an inner circumferential side from the outer circumferential edge 34, and still more preferably a region surrounded by the outer circumferential edge 34 of the printing layer 3 and a virtual line corresponding to more than 0 mm and 0.3 mm or less.

Figure 3A:
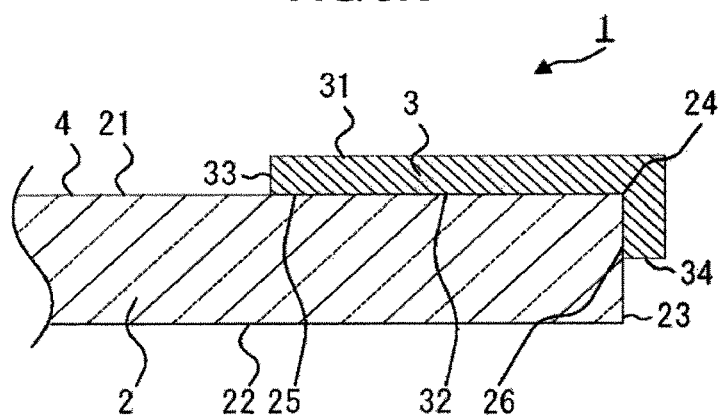
FIG. 3A and FIG. 3B are cross-sectional views according to modification examples of the first embodiment of the present invention.
Figure 3B:
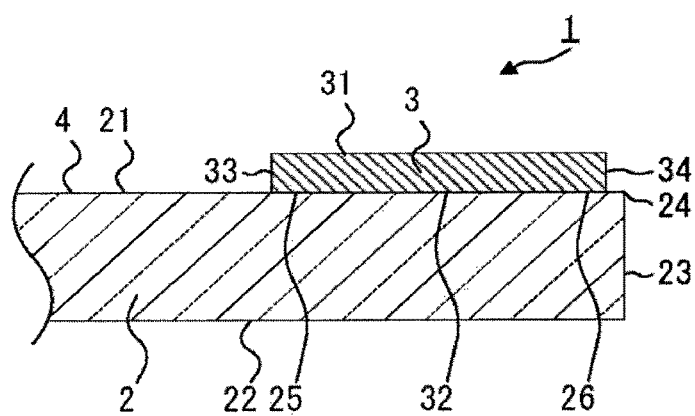

When the portion between the first main surface 21 or the second main surface 22 and the edge face 23 is defined as a connection part 24, it is preferred that the printing layer 3 is formed so as to cover the connection part 24 as illustrated in FIG. 3A. However, it is more preferred that the printing layer 3 is formed such that the outer circumferential edge 34 is placed on the connection part 24 as illustrated in FIG. 2, and it is still more preferred that the printing layer 3 is formed such that the outer circumferential edge 34 is placed in a region on the first main surface 21 or the second main surface 22 at a position of more than 0 mm and 0.5 mm or less from the edge face 23 of the plate 2 as illustrated in FIG. 3B. Furthermore, in order to increase dimensional stability in incorporating the plate 1 with a printing layer of the present embodiment in a display device that is a final product, it is particularly preferred that the printing layer 3 is formed such that the entire circumference of the outer circumferential edge 34 is placed in a region on the first main surface 21 or the second main surface 22 at a position of more than 0 mm and 0.5 mm or less from the edge face 23 of the plate 2. Accordingly the outer circumferential region 26 is located on the vicinity of the outer circumferential edge of the plate 2. Then, a part of an ink used in the printing layer 3 enters unevenness of a site of the outer circumferential region 26 having a large surface roughness, and the printing layer 3 is strongly fixed to the plate 2. As a result, peeling and crack of the printing layer 3 are difficult to occur even when an impact is applied to the outer circumferential edge 34 of the printing layer 3.

It is preferred that the inner circumferential part 3a of the printing layer is a region surrounded by the inner circumferential edge 33 of the printing layer 3 and a virtual line corresponding to more than 0 mm and 0.5 mm or less toward the outer circumferential side from the inner circumferential edge 33. The inner circumferential part 3a is located in the vicinity of the inner circumferential edge 33 of the printing layer 3 and is a site that a user is most easy to recognize, and beautiful appearance can be obtained by decreasing the surface roughness of the inner circumferential region 25 as compared with the outer circumferential region 26. The surface roughness $R_1$ of the inner circumferential region 25 is preferably 0.5 nm or more and 20 nm or less, more preferably 1 nm or more and 10 nm or less, and still more preferably 1 nm or more and 5 nm or less. The inner circumferential part 3a of the printing layer 3 is more preferably a region surrounded by the inner circumferential edge 33 of the printing layer 3 and a virtual line corresponding to more than 0 mm and 0.4 mm or less toward the outer circumferential side from the inner circumferential edge 33, and is more preferably a region surrounded by the inner circumferential edge 33 of the printing layer 3 and a virtual line corresponding to more than 0 mm and 0.3 mm or less.

(Second Embodiment)
(Plate with Printing Layer Having Connection Part 24 of Arc-shaped Cross-section)

The second embodiment is the same as the first embodiment, except for the shape of the connection part 24. In the description of the second embodiment, the same structure as the first embodiment is denoted by the same reference numeral and sign, and the explanation thereof is omitted.

Figure 4A:
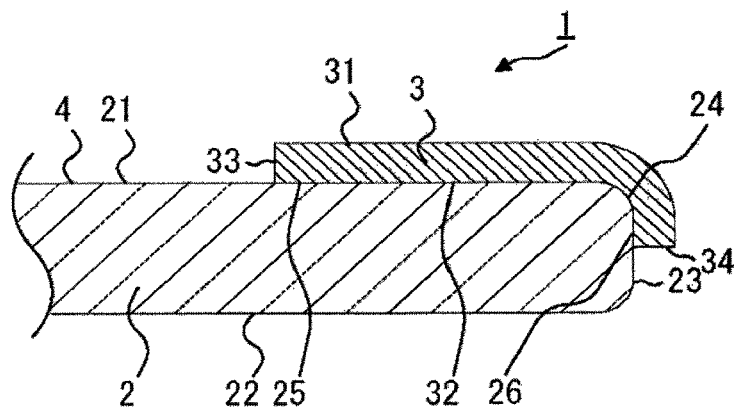
FIG. 4A, FIG. 4B and FIG. 4C are cross-sectional views of a plate with a printing layer according to a second embodiment of the present invention.
Figure 4B:
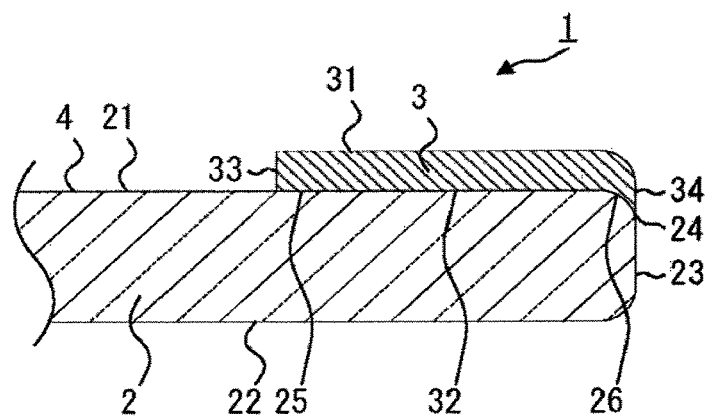
Figure 4C:
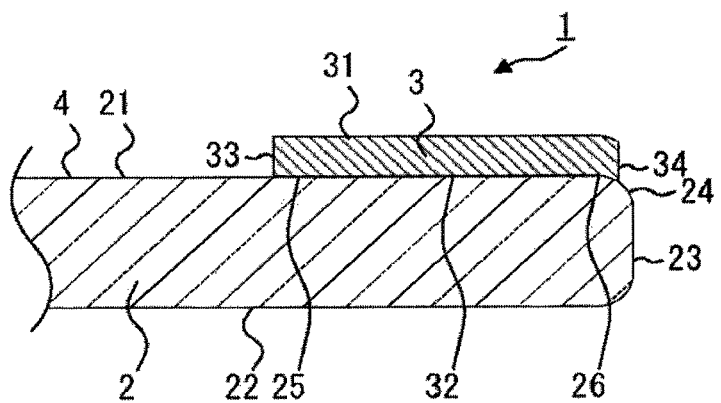

FIG. 4A, FIG. 4B and FIG. 4C illustrate cross-sectional views of the plates 1 with a printing layer according to the second embodiment. In the second embodiment, the connection part 24 has an arc-shaped cross-section that is a curved surface having a center of curvature inside the plate 2 and having a radius of curvature of 0.05 mm or more and 0.5 mm or less. The radius of curvature is preferably 0.05 mm or more and 0.4 mm or less, and more preferably 0.05 mm or more and 0.3 mm or less. Accordingly, an impact caused at the time of factory shipment and product assembly disperses without concentrating in one part and, and as a result, peeling and crack of the printing layer 3 can be suppressed more reliably.

In at least a part of the plate 2, the surface roughness $R_1$ of the inner circumferential region 25 and the surface roughness $R_2$ of the outer circumferential region 26 satisfy the relationship of $R_2 > R_1$. Accordingly, a part of the ink of the printing layer 3 enters unevenness of a site of the outer circumferential region 26 having a large surface roughness, and the printing layer 3 is strongly fixed to the plate 2. Therefore, even when an impact is applied to the outer circumferential edge 34 of the printing layer 3, peeling and crack of the printing layer 3 can be made difficult to occur. In order to achieve these effects, for example, the printing layer 3 may be formed so as to cover the connection part 24 in the outer circumferential region 26 as illustrated in FIG. 4A, the printing layer 3 may be formed such that the outer circumferential edge 34 of the printing layer 3 is consistent with the edge face 23 in a planar view in the outer circumferential region 26 or such that the entire circumference of the outer circumferential edge 34 of the printing layer 3 is consistent with the edge face 23 in a planar view as illustrated in FIG. 4B, and the printing layer 3 may be formed such that the outer circumferential edge 34 of the printing layer 3 is placed on the connection part 24 of the first main surface 21 or the second main surface 22 at a position of more than 0 mm and 0.5 mm or less from the edge face 23 in the outer circumferential region 26 as illustrated in FIG. 4C. Furthermore, in order to increase dimensional stability in incorporating the plate 1 with a printing layer of the present embodiment in a display device that is a final product, the printing layer 3 may be formed such that the entire circumference of the outer circumferential edge 34 of the printing layer 3 is placed on the connection part 24 of the first main surface 21 or the second main surface 22 at a position of more than 0 mm and 0.5 mm or less from edge face 23.

The connection part 24 according to the second embodiment can be formed by grinding, blasting, etching or the like, but is preferably formed by grinding.

(Third Embodiment)
(Plate with Printing Layer Having Connection Part 24 of Cross-sectional Line Segment Shape)

The third embodiment is the same as the first embodiment, except for the shape of the connection part 24. In the description of the third embodiment, the same structure as the first embodiment is denoted by the same reference numeral and sign, and the explanation thereof is omitted.

Figure 5A:
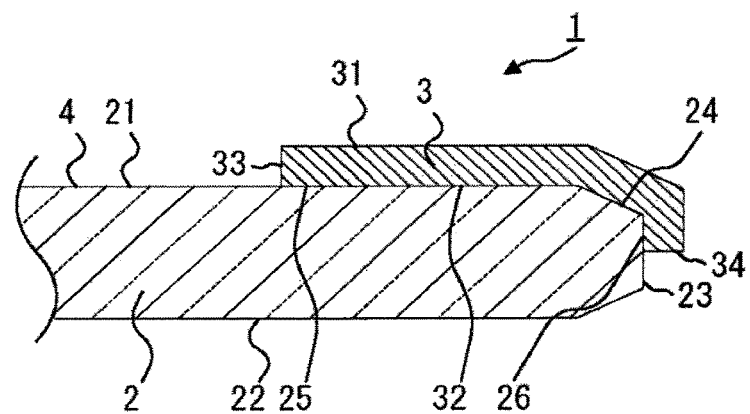
FIG. 5A, FIG. 5B and FIG. 5C are cross-sectional views of a plate with a printing layer according to a third embodiment of the present invention.
Figure 5B:
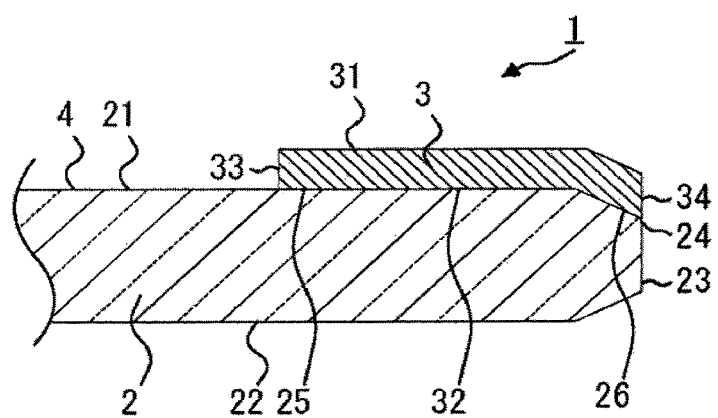
Figure 5C:
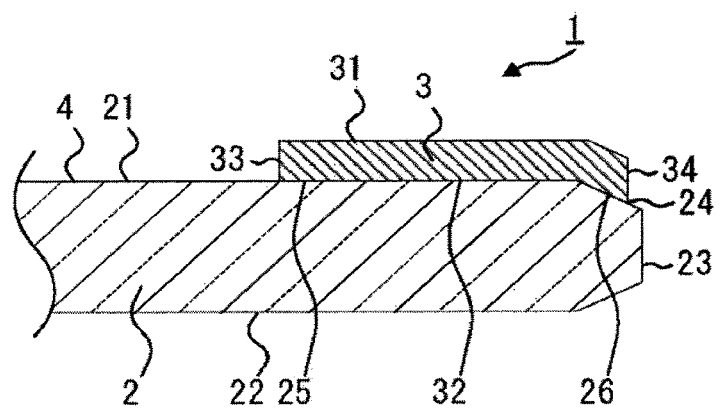

FIG. 5A, FIG. 5B and FIG. 5C illustrate cross-sectional views of the plates 1 with a printing layer according to the third embodiment. In the third embodiment, the connection part 24 constitutes a line segment connecting a side corresponding to the first main surface 21 or the second main surface 22 and a side corresponding to the edge face 23 in a cross-sectional view in a thickness direction. The angle at a plate side formed at the intersection point between one of the sides corresponding to the first main surface 21 and the second main surface 22 and the line segment, and the angle at a plate side formed at the intersection point between the side corresponding to the edge face 23 and the line segment are an obtuse angle. Accordingly, impact caused at the time of factory shipment and product assembly is prevented form being partially concentrated, and as a result, peeling and crack of the printing layer 3 can be suppressed. Furthermore, it is preferred that the total of the above two obtuse angles is 270°.

The width of the connection part 24 according to the third embodiment is preferably 0.05 mm or more and 0.5 mm or less, more preferably 0.05 mm or more and 0.4 mm or less, and still more preferably 0.05 mm or more and 0.3 mm or less, from the edge face 23 in a planar view of the plate 1 with a printing layer. Accordingly, impact caused at the time of factory shipment and product assembly is prevented form being partially concentrated, and as a result, peeling and crack of the printing layer 3 can be suppressed.

The surface roughness $R_1$ of the inner circumferential region 25 and the surface roughness $R_2$ of the outer circumferential region 26 satisfy the relationship of $R_2 > R_1$. Accordingly, a part of the ink of the printing layer 3 enters unevenness of a site of the outer circumferential region 26 having a large surface roughness, and thus the printing layer 3 is strongly fixed to the plate 2. Therefore, even when an impact is applied to the outer circumferential edge 34 of the printing layer 3, peeling and crack of the printing layer 3 can be difficult to occur. For this reason, the printing layer 3 may be formed so as to cover the connection part 24 in the outer circumferential region 26 as illustrated in FIG. 5A, it is preferred that the printing layer 3 is formed such that the outer circumferential edge 34 of the printing layer 3 is consistent with the edge face 23 in the outer circumferential region 26 in a planar view as illustrated in FIG. 5B, it is more preferred that the printing layer 3 is formed such that the entire circumference of the outer circumferential edge 34 of the printing layer 3 is consistent with the edge face 23 in a planar view, and it is particularly preferred that the printing layer 3 is formed such that the outer circumferential edge 34 of the printing layer 3 is present on the connection part 24 of the first main surface 21 or the second main surface 22 at a position of more than 0 mm and 0.5 mm or less from the edge face 23 in the outer circumferential region 26 as illustrated in FIG. 5C. Furthermore, in order to increase dimensional stability in incorporating the plate 1 with a printing layer of the present embodiment into a display device that is a final product, it is particularly preferred that the printing layer 3 is formed such that the entire circumference of the outer circumferential edge 34 of the printing layer 3 is present on the connection part 24 of the first main surface 21 or the second main surface 22 at a position of more than 0 mm and 0.5 mm or less from the edge face 23.

The connection part 24 according to the third embodiment can be formed by grinding, blasting, etching or the like, but is preferably formed by grinding.

The present invention is not limited to the above-described each embodiment, and modification, improvement and the like in a range that the object of the present invention can be achieved are incorporated in the present invention.

(Modification Example)

As for the plate 2 in the present invention, use can be made of various plates having various shapes and various materials depending on the purpose of use. As the shape, for example, not only a plate having only flat surface, but a curved plate having curvature in the entire surface and a plate partially having a bending part may be used. Such a curved plate shows some variation depending on processing accuracy at the time of molding, and thus it is assumed that load is applied to the bending part at the time of combining in a display device. Since the plate 1 with a printing layer of the present embodiment is that the printing layer is difficult to cause peeling and crack even when a load is applied, it is very useful. Furthermore, the plate 2 is not limited to a plate shape, and may be a film shape. Any material may be used so long as it is transparent. General glasses such as an inorganic glass and an organic glass such as polycarbonate or acryl glass can be used, and other synthetic resins can be used.

In the case of using an inorganic glass, its thickness is preferably 0.5 mm or more and 5 mm or less. Because a glass having a thickness of the lower limit or more has high strength and further has good texture, there is an advantage that a plate with a printing layer having both high strength and good texture can be obtained. The thickness is more preferably 0.7 mm or more and 3 mm or less, and still more preferably 1 mm or more and 3 mm or less. Furthermore, the inorganic glass may be subjected to a chemically strengthening treatment or a physically strengthening treatment, and is preferably subjected to a chemically strengthening treatment. In the case of applying strengthening treatment to a relatively thin inorganic glass as described above, chemically strengthening treatment is proper.

Furthermore, an organic glass, a synthetic resin and the like may be a laminated substrate, regardless of the same kind and different kind, and various adhesive layers may be interposed among those.

The plate 2 in the present invention may have a treatment layer such as antiglare treatment (AG treatment), antireflection treatment (AR treatment), antifingerprint treatment (AFR treatment) or the like on both surfaces of the first main surface 21 and the second main surface 22. In order to improve adhesiveness with the printing layer, primer treatment, etching treatment or the like may be performed.

The printing layer 3 in the present invention may be formed by various printing methods and inks (printing materials) depending on the purpose of use. Examples of the printing method used include spray printing and screen printing. Those methods can provide good printings even on a transparent plate having large area. Particularly, in spray printing, it is easy to print on a transparent plate having a bending part, and it is easy to adjust surface roughness of a printing surface. On the other hand, in screen printing, it is easy to form a desired printing pattern on a wide transparent plate such that the printing pattern has a uniform average thickness. A plurality of inks may be used, but from the standpoint of adhesiveness of the printing layer, it is preferred to use a single ink.

The ink forming the printing layer 3 in the present invention may be an inorganic ink or may be an organic ink. The inorganic ink may be, for example, a composition containing at least one selected from $SiO_2$, $ZnO$, $B_2O_3$, $Bi_2O_3$, $Li_2O$, $Na_2O$ and $K_2O$, at least one selected from $CuO$, $Al_2O_3$, $ZrO_2$, $SnO_2$ and $CeO_2$, $Fe_2O_3$, and $TiO_2$.

As the organic ink, various printing materials obtained by dissolving a resin in a solvent can be used. For example, use can be made of at least one resin selected from the group consisting of acryl resin, urethane resin, epoxy resin, polyester resin, polyamide resin, vinyl acetate resin, phenol resin, olefin, ethylene-vinyl acetate copolymer resin, polyvinyl acetal resin, natural rubber, styrene-butadiene copolymer, acrylonitrile-butadiene copolymer, polyester polyol, polyether polyurethane polyol, and the like. Furthermore, use can be made of water, alcohols, esters, ketones, aromatic hydrocarbon solvents, and aliphatic hydrocarbon solvents, as the solvent. Examples of the alcohols include isopropyl alcohol, methanol, ethanol and the like, examples of the esters include ethyl acetate, and examples of ketones include methyl ethyl ketone. Furthermore, examples of the aromatic hydrocarbon solvents include toluene, xylene, Solvesso 100, Solvesso 150 and the like, and examples of the aliphatic hydrocarbon solvents include hexane and the like. Those are exemplified as an example, and other various printing materials can be used. With the organic printing material, the printing layer can be formed by applying the material to a transparent plate and evaporating a solvent, thereby forming a layer of a resin.

The ink used in the printing layer 3 may contain a coloring agent. For example, in the case that the printing layer 3 is made to be black, a black coloring agent such as carbon black can be used as the coloring agent. Other than this, a coloring agent having appropriate color can be used depending on the desired color.

The plate 1 with a printing layer of the present invention can be used as a cover for a display device, such as a cover glass of panel display such as liquid crystal display, a portable equipment such as smartphone, and the like. The plate 1 with a printing layer of the present invention is particularly suitable as a cover glass for an in-vehicle display device. In the process of producing an in-vehicle display device, the plate 1 with a printing layer is packaged and shipped, and then, in a display device assembling maker, the plate 1 with a printing layer is subjected to various steps of mounting, assembling, transporting or the like. Conventionally, peeling and crack of the printing layer 3 have been easy to occur due to vibration at the time of shipment, handling at the time of display device assembling and the like, resulting in many defective products. In the present invention, the printing layer 3 can be strongly fixed onto the plate 2, and the generation of the above-described defective products can be greatly decreased.

Figure 6A:
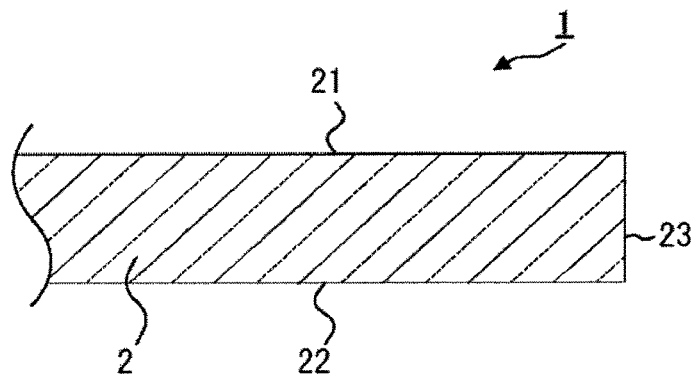
FIG. 6A, FIG. 6B and FIG. 6C are explanatory views of production steps of a plate with a printing layer.
Figure 6B:
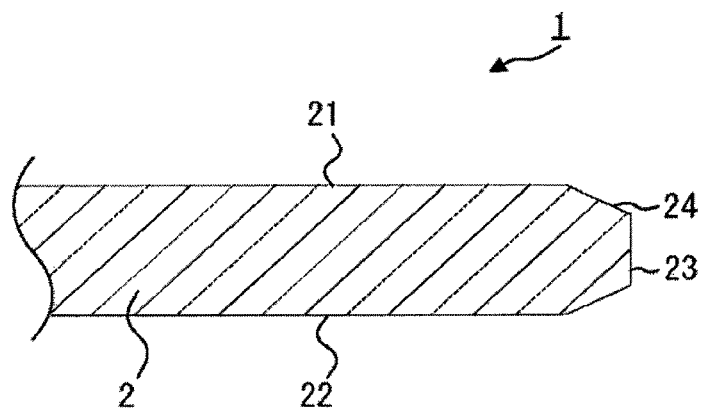
Figure 6C:
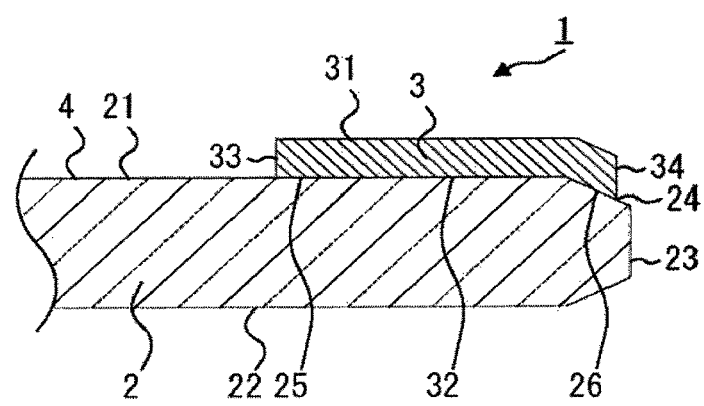

The production method of the plate 1 with a printing layer according to the embodiment of the present invention is described below by reference to FIG. 6A to FIG. 6C. In FIG. 6A to FIG. 6C, the same constitutional element as the constitutional element described above is denoted by the reference numeral and sign, and the explanation thereof is omitted or simplified.

FIG. 6A illustrates a cross-sectional view of the plate 2. First, a plate material having a desired composition and a desired thickness is cut and processed into a desired size that is suitable in incorporating into a display device that is a final product, to thereby prepare the plate 2.

In order to form the printing layer 3 that is difficult to peel and is formed in the subsequent step, the periphery of the respective connection parts 24 between the first main surface 21 and the second main surface 22 and the edge face 23 is ground to form the plate 2 in which the connection part has a cross-sectional line segment shape as illustrated in FIG. 6B. This can be achieved by grinding, blast treatment, etching or the like, and among these, grinding is preferably adopted. It is generally preferred to perform grinding so-called "C chamfering", but the grinding is not limited to this. For example, the periphery of the connection part 24 is ground by using #600 grinding stone.

The number of revolution, moving speed or the like of a grinding stone may affect surface roughness, but as long as the surface roughness of 100 nm or more and 1000 nm or less can be achieved, it is not particularly limited.

The printing layer 3 is formed on the first main surface 21 such that the connection part 24 having a cross-sectional line segment-shape constitutes the outer circumferential region 26, to thereby prepare the plate 1 with a printing layer as illustrated in FIG. 6C. In the printing, various printing methods can be utilized, but, for example, preferred is a screen printing. The screen printing is the printing using holes, and an object to be printed is not limited. Furthermore, since the screen printing can be applied to an object having some bent part, it can be preferably used to the printing on the plate 2.

It is preferred that the printing layer 3 is formed such that the outer circumferential edge 34 of the printing layer 3 is placed on the connection part 24. It is particularly preferred that the entire circumference of the outer circumferential edge 34 of the printing layer 3 is placed on the connection part 24 as illustrated in FIG. 6C. The reason for this is that dimensional stability in incorporating the plate 1 with a printing layer into a display device that is a final product, is enhanced.

Accordingly, the printing layer 3 enters unevenness of a site of the connection part 24 having a large surface roughness, and is strongly fixed to the plate 2. As a result, even when an impact is applied to the outer circumferential edge 34 of the printing layer 3, peeling and crack of the printing layer 3 are difficult to occur.

The printing may be repeated in the desired number, and as the ink used in printing, different ink in each layer may be used. For example, in the case where it is desired to make the printing region look white when an observer observes the plate with a printing layer from the surface through the plate, for example, white printing may be first applied, and black printing may be then applied. Accordingly, a white printing layer can be formed in which "see-through feeling", which relates to visibility of back side of the printing layer when a user observes the printing layer through the plate, has been suppressed.

Drying step and sintering step may be carried out in the last and half way of the above-described printing step, and the timing and temperature conditions for carrying out those steps can be appropriately selected depending on the characteristics of the ink used.

Other than the above-described steps, a strengthening treatment step may be conducted in the case where the plate 2 is an inorganic glass. In addition, a functional film treatment step such as antiglare treatment (AG treatment), anti-reflection treatment (AR treatment) or anti-fingerprint treatment (AFP treatment) may be conducted on the first main surface 21 or the second main surface 22 of the plate 2 or both surfaces thereof.

Figure 7A:
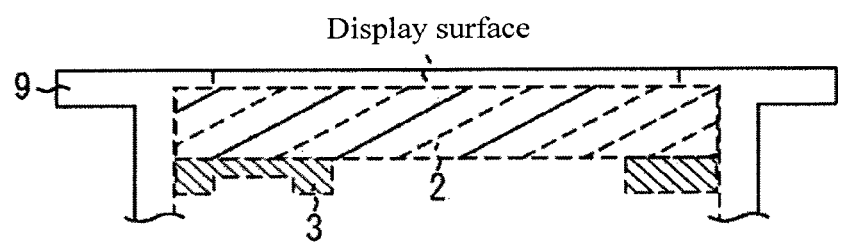
FIG. 7A is a schematic view of a structure in which a plate with a printing layer is arranged in a frame.
Figure 7B:
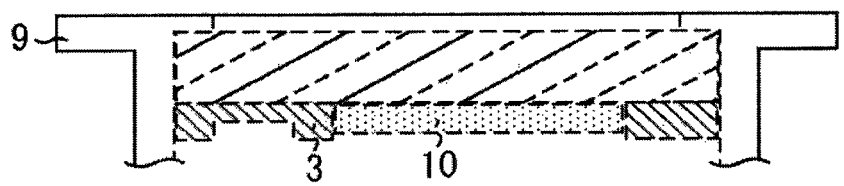
FIG. 7B is a schematic view of a structure in which an adhesive layer is further provided thereon.
Figure 7C:
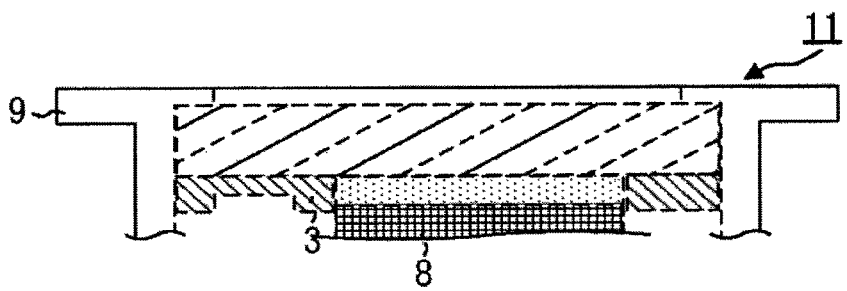
FIG. 7C is a schematic view of a structure in which a liquid crystal module is further provided thereon.

The production method of a display device using the plate with a printing layer according to the embodiment of the present invention is described below by reference to FIG. 7A to FIG. 7C. In FIG. 7A to FIG. 7C, the same constitutional element as the constitutional element described above is denoted by the same reference numeral and sign, and the explanation thereof is omitted or simplified.

FIG. 7A is a cross-sectional view of one example of a structure in which the plate 1 with a printing layer prepared above is arranged in a frame 9. The plate 1 with a printing layer may be fixed to the frame 9 by utilizing an adhesive layer or the like, or may be fixed by being sandwiched with the frame 9 constituted of two kinds of structures. There is no particular limitation in fixing manner. The shape and material of the frame 9 are also not particularly limited, and can be appropriately designed and selected.

FIG. 7B is one example of a structure in which an adhesive layer 10 is adhered to the structure of the plate 1 with a printing layer and the frame 9, obtained in FIG. 7A. The shape and size of the adhesive layer 10 are preferably the shape and size fitting to the display region 4 of the plate 1 with a printing layer, but are not particularly limited.

The adhesive layer 10 is transparent like the plate 2, and it is preferred that the difference in refractive index between the plate 2 and the adhesive layer 10 is small.

Example of the adhesive layer 10 includes a layer formed of a transparent resin obtained by curing a liquid curable resin composition. Examples of the curable resin composition include a photocurable resin composition and a thermosetting resin composition. Above all, a photocurable resin composition containing a curable compound and a photopolymerization initiator is preferred. The curable resin composition is applied by, for example, using a method such as die coater or roll coater to form a curable resin composition film.

The adhesive layer 10 may be an optical clear adhesive film (OCA film, OCA tape). In this case, the OCA film is adhered to the display region 4 at the first main surface 21 side of the plate 1 with a printing layer.

The thickness of the adhesive layer 10 may be, for example, from 5 μm to 400 μm, and preferably from 50 μm to 200 μm. The storage shear modulus of the adhesive layer 10 may be, for example, from 5 kPa to 5 MPa, and preferably from 1 MPa to 5 MPa.

FIG. 7C is one example of a structure in which a liquid crystal module 8 is adhered to the adhesive layer 10 of the structure obtained in FIG. 7B. Accordingly, a display device 11 equipped with the plate 1 with a printing layer of the present invention can be manufactured.

In preparing the display device 11 of the present invention, the assembly sequence is not particularly limited. For example, a structure in which the adhesive layer 10 is arranged on the plate 1 having a printing layer may be previously prepared, this structure may be arranged in the frame 9, and the liquid crystal module 8 may be then adhered thereto.

Other than the above structure, the display device may be provided with a touch sensor. In the case of incorporating a touch sensor, the touch sensor may be arranged on the display region 4 at the first main surface 21 side of the plate 1 with a printing layer through the adhesive layer 10, and the liquid module 8 may be arranged thereon through another adhesive layer 10.

EXAMPLE

Examples of the present invention are described below. The present invention is not construed as being limited to the following Examples. Example 1 is an example of the present invention, and Example 2 is a comparative example.

A plate-shaped glass that is a glass plate having a thickness of 2 mm and having a quadrilateral main surfaces (Dragontrail (registered trademark), manufactured by Asahi Glass Co., Ltd.) was used for the plate 2, and a glass plate with a printing layer was obtained by the following procedures. Hereinafter, one main surface of the glass plate is called a first main surface (first surface), and the other main surface is called a second main surface (second surface).

Example 1

A glass plate was subjected to (1) antiglare treatment, (2) grinding treatment of an edge face, (3) chemically strengthening treatment and alkali treatment, (4) and formation of a printing region, in this order by the following procedures.
(1) Antiglare Treatment A second main surface of a glass plate was subjected to an antiglare treatment by means of a frost treatment in the following procedures.

An acid-resistant protective film (hereinafter simply referred to as a "protective film") was adhered to a main surface (first surface) at the side that is not subjected to an antiglare treatment, of the glass plate. The glass plate was dipped in a 3 mass % hydrogen fluoride aqueous solution for 3 minutes so that the glass plate was etched to remove contaminants adhered to a second main surface of the etched glass plate. Subsequently, the glass plate was dipped in a mixed aqueous solution of 15 mass % hydrogen fluoride and 15 mass % potassium fluoride for 3 minutes to conduct a frost treatment on the first surface of the glass plate. Thereafter, the glass plate was dipped in a 10 mass % hydrogen fluoride aqueous solution for 6 minutes to conduct an antiglare treatment, thereby adjusting Haze value to 25%. The Haze value was measured by using Haze meter (trade name: HZ-V3, manufactured by Suga Test Instruments Co., Ltd.) according to JIS K 7136: 2000.
(2) Grinding Treatment of Edge Face The glass plate having been subjected to the antiglare treatment was cut into a size of 150 mm×250 mm. Thereafter, C chamfering was conducted over the entire circumference of the glass plate in a width of 0.2 mm from the edge face of the glass. The chamfering was conducted by using #600 grinding stone (manufactured by Tokyo Diamond Tools Mfg. Co., Ltd.) under the conditions that the number of rotation of the grinding stone was 6,500 rpm and moving speed of the grinding stone was 5,000 mm/min. The surface roughness of the edge face was adjusted to 450 nm by this treatment.
(3) Chemically Strengthening Treatment and Alkali Treatment The protective film adhered to the glass plate was removed, and the glass plate was dipped for 2 hours in potassium nitrate salt that was heated to 450° C. and melted. Thereafter, the glass plate was taken out of the molten salt, and annealed to room temperature over 1 hour to conduct a chemically strengthening treatment. Thereby, a chemically strengthened glass plate having surface compressive stress (CS) of 730 MPa and a depth of stress layer (DOL) of 30 μm was obtained.

Furthermore, the glass plate was dipped in an alkali solution (trade name: SUNWASH TL-75, manufactured by Lion Co., Ltd.) for 4 hours to conduct an alkali treatment.
(4) Formation of Printing Layer Black frame having a width of 2 cm was printed on four sides of the outer circumferential part of the first surface of the glass plate to form a printing layer. Black ink (trade name: GL SHF, manufactured by Teikoku Printing Ink Mgf. Co., Ltd.) was applied in a thickness of 5 μm by a screen printing machine, and dried by holding at 150° C. for 30 minutes. Printing was conducted such that the outer circumferential edge of the printing layer was formed on the edge face having been subjected to a grinding treatment at a position of 0.1 mm from the edge face of the glass plate in a planar view.

Accordingly, a glass plate with a printing layer as illustrated in FIG. 4C was obtained.

Example 2

A glass plate was subjected to the same procedures as in Example 1 in the order of (1) antiglare treatment, (3) chemically strengthening treatment and alkali treatment, and (4) formation of a printing region, except that (2) grinding treatment of an edge face was not carried out. That is, Example 2 differs from Example 1 in that a grinding treatment was not conducted and an outer circumferential edge of the printing layer was formed on a flat site having small surface roughness.
Evaluation Peeling test of a printing layer was performed by using the glass plates with a printing layer obtained in Example 1 and Example 2 by the following method.
(Peeling Test of Printing Layer)

Peeling resistance of the printing layer was carried out as follows. A film that is used in shipping out a glass plate with a printing layer was adhered to a first surface of the glass plate. The film was peeled in a constant speed while maintaining a constant angle, and it was confirmed as to whether or not the printing layer causes peeling and the like.

The film used was EC9000ASL (trade name, manufactured by Sumiron Co., Ltd.) in which an acryl paste was adhered as an adhesive to a PET substrate.

Attention was paid such that space did not remain between the first surface and the film when adhering the film to the first surface, and load of 0.1 MPa was applied by rollers to adhere, and then the test was conducted.

The test was performed such that the peeling speed of the film was set to 50 mm/min, and an angle between the glass plate with a printing layer and the film became 90°.

Ten test samples having the film adhered to the glass plate with a printing layer were prepared as for Examples 1 and 2, respectively, and the test was conducted.

In Example 2, peeling or the like of the printing layer was observed in 8 samples of 10 samples. The peeling almost occurred starting from the outer circumferential edge of the printing layer. On the other hand, in Example 1, the sample in which peeling or the like of the printing layer was observed was one sample of 10 samples, and peeling or the like of the printing layer was suppressed as compared with Example 2.

From the above, it was understood that the glass plate with a printing layer of the example according to the present invention exhibits excellent peeling resistance as compared with the glass plate with a printing layer of the comparative example.

The present application is based on Japanese Patent Application No. 2015-222706 filed on Nov. 13, 2015, which contents are incorporated herein by reference.

INDUSTRIAL APPLICABILITY

The plate with a printing layer according to the present invention can be utilized in a protective member or the like of an in-vehicle display device, a display and the like.

DESCRIPTION OF REFERENCE NUMERALS AND SIGNS

1 Plate with printing layer
2 Plate
21 First main surface
22 Second main surface
23 Edge face
24 Connection part
25 Inner circumferential region
26 Outer circumferential region
3 Printing layer
3a Outer circumferential part
3b Inner circumferential part
31 Non-contact face
32 Contact face
33 Inner circumferential edge
34 Outer circumferential edge
4 Display region
9 Frame
10 Adhesive layer
11 Display device

What is claimed is:

1. A plate with a printing layer, comprising:
a plate having a first main surface, a second main surface and an edge face; and
a printing layer provided on a periphery of the first main surface and comprising an outer circumferential part and an inner circumferential part,
wherein the plate has an outer circumferential part that corresponds to the outer circumferential part of the printing layer and an inner circumferential part that corresponds to the inner circumferential part of the printing layer,
wherein the outer circumferential part of the plate has an outer circumferential region in at least a part of the whole circumference of the plate, and the inner circumferential part of the plate contains an inner circumferential region that corresponds to the outer circumferential region, and
wherein the outer circumferential region has a surface roughness $R_2$ and the inner circumferential region has a surface roughness $R_1$, and the $R_2$ is larger than the $R_1$.

2. The plate with a printing layer according to claim 1, wherein 100 nm≤$R_2$≤1000 nm is satisfied.

3. The plate with a printing layer according to claim 1, wherein the plate further comprises a connection part between the first main surface and the edge face, and the connection part constitutes the outer circumferential region.

4. The plate with a printing layer according to claim 3, wherein the printing layer has an outer circumferential edge placed on the connection part.

5. The plate with a printing layer according to claim 3, wherein the connection part is a curved surface having a center of curvature inside the plate and having a radius of curvature of 0.05 mm or more and 0.5 mm or less.

6. The plate with a printing layer according to claim 3, wherein the connection part forms a line segment that connects a side corresponding to the first main surface with a side corresponding to the edge face in a cross-sectional view in a thickness direction, and two angles at a plate side formed at intersections between respective one of the sides and the line segment become an obtuse angle.

7. The plate with a printing layer according to claim 6, wherein the total of the two angles is 270°.

8. The plate with a printing layer according to claim 5, wherein the width of the connection part is 0.05 mm or more and 0.5 mm or less from the edge face in a planar view of the plate.

9. The plate with a printing layer according to claim 1, wherein the printing layer has an outer circumferential edge, and the outer circumferential part of the printing layer is a region surrounded by the outer circumferential edge and a virtual line corresponding to more than 0 mm and 0.5 mm or less toward the inner circumferential side of the printing layer from the outer circumferential edge.

10. The plate with a printing layer according to claim 1, wherein the printing layer has an inner circumferential edge, and the inner circumferential part of the printing layer is a region surrounded by the inner circumferential edge and a virtual line corresponding to more than 0 mm and 0.5 mm or less toward the outer circumferential side of the printing layer from the inner circumferential edge.

11. The plate with a printing layer according to claim 1, wherein the plate is formed of a glass.

12. The plate with a printing layer according to claim 11, wherein the glass is a strengthened glass.

13. A display device, comprising:
the plate with a printing layer according to claim 1.

14. The display device according to claim 13, further comprising:
a frame supporting the plate with a printing layer;
a liquid crystal module; and
an adhesive layer connecting the plate with a printing layer to the liquid crystal module.

* * * * *